(12) United States Patent
Wald et al.

(10) Patent No.: US 11,555,725 B2
(45) Date of Patent: Jan. 17, 2023

(54) MICROSTRUCTURED FLUID FLOW CONTROL DEVICE

(71) Applicant: Fraunhofer-Gesellschaft zur Förderung der angewandten Forschung e.V., Munich (DE)

(72) Inventors: Christian Wald, Munich (DE); Sebastian Kibler, Munich (DE); Martin Wackerle, Munich (DE); Yuecel Congar, Munich (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 352 days.

(21) Appl. No.: 16/942,558

(22) Filed: Jul. 29, 2020

(65) Prior Publication Data
US 2021/0041280 A1    Feb. 11, 2021

(30) Foreign Application Priority Data

Aug. 8, 2019    (DE) .......................... 102019211941.7

(51) Int. Cl.
*G01F 11/08* (2006.01)
*F16K 99/00* (2006.01)

(52) U.S. Cl.
CPC .......... *G01F 11/08* (2013.01); *F16K 99/0015* (2013.01); *F16K 99/0048* (2013.01)

(58) Field of Classification Search
CPC .. G01F 11/08; F16K 99/0015; F16K 99/0048; F16K 99/0005; B81B 3/0021; B81B 7/02
See application file for complete search history.

(56) References Cited

U.S. PATENT DOCUMENTS

| | | |
|---|---|---|
| 6,488,652 B1 | 12/2002 | Weijand et al. |
| 6,991,214 B2 | 1/2006 | Richter |
| 8,551,055 B2 | 10/2013 | McConnell et al. |
| 9,410,641 B2 | 8/2016 | Herz et al. |
| 2004/0036047 A1 | 2/2004 | Richter |

(Continued)

FOREIGN PATENT DOCUMENTS

| | | |
|---|---|---|
| CN | 109578686 B | 7/2021 |
| DE | 10048376 C2 | 9/2002 |
| DE | 102016201718 A1 | 8/2017 |

*Primary Examiner* — Donnell A Long
(74) *Attorney, Agent, or Firm* — Perkins Coie LLP; Michael A. Glenn

(57) ABSTRACT

A microstructured fluid flow control device includes a substrate with a piezo-actuated first membrane arranged on a first substrate side, and a fluid channel that extends through the substrate between the first substrate side and an opposite second substrate side. In addition, the microstructured fluid flow control device includes a microvalve that extends through the fluid channel and is configured to close the fluid channel in an unactuated state, and a second membrane arranged on the first substrate side and spaced apart from the membrane and arranged between the fluid channel and the first piezo-actuated membrane. The second membrane is joined to the microvalve and is mechanically biased towards the first membrane so that a biasing force is applied to the microvalve, wherein the biasing force is part of a restoring force that causes the microvalve to close the fluid channel in an unactuated state.

14 Claims, 11 Drawing Sheets

(56) References Cited

U.S. PATENT DOCUMENTS

| | | |
|---|---|---|
| 2006/0027772 A1 | 2/2006 | Richter et al. |
| 2006/0147329 A1* | 7/2006 | Tanner ..................... F04B 7/00 |
| | | 417/505 |
| 2013/0055889 A1 | 3/2013 | Herz et al. |
| 2013/0068325 A1* | 3/2013 | Herz ....................... F04B 43/14 |
| | | 251/359 |
| 2017/0226994 A1 | 8/2017 | Richter et al. |

* cited by examiner

MICROSTRUCTURED FLUID FLOW CONTROL DEVICE

CROSS-REFERENCE TO RELATED APPLICATION

This application claims priority from German Patent Application No. DE 10 2019 211 941.7, which was filed on Aug. 8, 2019, and is incorporated herein in its entirety by reference.

BACKGROUND OF THE INVENTION

The invention concerns a microstructured fluid flow control device, and particularly a microstructured valve and a controllable flow resistor in the sense of a proportional valve. Some examples provide a normally-closing microvalve with a piezo membrane actuator and an inverting transmission element as well as a normally-closing microvalve with a piezo disc actuator.

The invention is in the technical field of microfluidics, and particularly in the technical field of microdosing technology, in which very small quantities in the range of microliters and sub-microliters may be output in a dosed manner. In particular, the microdosing technology is used in the medical field, e.g. in (subcutaneous) microdosing patches, catheters, implants and the like. However, the microdosing technology may also be used advantageously in the industrial environment, e.g. in microhydraulics or micropneumatics, as shut-off valves for ultra-fine oil dosing and the like.

Many applications in the microdosing technology need a device to precisely control the fluid flow, as well as an active shut-off device in the hydraulic or pneumatic fluid circuit with the lowest possible energy consumption. In addition, a closed state is often needed in the event of a power failure. Exemplary applications for this are extracorporeal or implantable drug dosing systems in which incorrect dosing may have series consequences, but also industrial applications such as the continuous supply of small quantities of lubricant to high-speed ball bearings. In this case, a valve closed without current would act as a shut-off device that prevents the oil-filled dosing channel from emptying in the unactuated state in the event of a power failure or functional failure. Herein, the property of closing a fluid channel in a currentless or unactuated state is also referred to as being "normally-closing".

In the microdosing technology, e.g., piezo-actuated micropumps are used for this purpose, wherein the pump membrane may be actuated by means of a piezo element, also referred to as piezo membrane actuator. The challenge in designing such an element lies in the principle property of piezo membrane actuators. Their force/deflection capacity is asymmetrical. For example, if a disc-shaped piezo membrane actuator is applied to a membrane, a lateral contraction takes place by applying a positive electric field, which leads to a downward deflection of the membrane. When applying a negative voltage, however, the membrane actuator curves upwards. Due to piezophysics, in contrast to the positive voltage, only a relatively low negative voltage can be applied before the piezo repolarizes.

Thus, in particular in the downward movement direction, the actuator is may be advantageously used in a technically efficient and manner, that is with a high opening force and a large deflection in relation to its structural size. This is particularly important in the miniaturization of a normally-closing microvalve, since piezo membrane actuators only have a vertical stroke of a few micrometers and a high flow rate is often needed in the open state. In addition, this stroke is reduced by bias pressures or fluid pressures that are present.

DE 100 48 376 C1 describes a normally-closed microvalve, i.e. a microvalve that closes a fluid channel in the unactuated state. Arranged on a first side of an actuator membrane is a piezo-ceramic by means of which the actuator membrane may be deflected downwards. Arranged on a second side of the actuator membrane is a tappet that moves a valve flap arranged underneath when the membrane is deflected. The tappet is implemented such that it is integral with the actuator membrane.

On the one hand, this microvalve comprises a relatively uncomplicated design. However, due to the above-mentioned inherent short strokes of a piezo-actuated membrane, the tappet fixed to the actuator membrane should be in direct contact with the valve flap in the idle state in order to ensure that the stroke of the actuator membrane actuates the valve flap as directly as possible without idle travel. However, due to manufacturing tolerances, the distance between the actuator membrane and the valve flap may be too small so that the tappet already slightly deflects the valve flap in the idle state. This may lead to the valve flap remaining slightly open in the idle state so that the tightness of the normally-closed microvalve is no longer ensured.

To create a distance between the actuator membrane and the valve flap, U.S. Pat. No. 9,410,641 B2 proposes to provide a micropump with a piezo-actuated membrane that is mechanically biased in the unactuated state. When manufacturing the micropump, an electric voltage is applied to the piezo membrane actuator. This electric voltage causes the piezo membrane actuator, and therefore the membrane connected thereto, to curve outwards. This curved arrangement of the membrane and the piezo membrane actuator is then mounted onto a pump substrate. After mounting, the electric voltage is removed. This results in a membrane that is mechanically biased in the unactuated state and that curves away from the substrate and is spaced apart from the valve flap.

Thus, in the idle state, a distance between the valve flap and the tappet that actuates the valve flap may be achieved in order to be able to ensure that the valve flap of the normally-closed microvalve described in DE 100 48 376 C1 is not kept open by the tappet in the idle state. In this way, tightness can be ensured in the idle state.

However, due to the manufacturing tolerances, it is possible that the biased membrane is biased too strongly so that the distance between the tappet mounted thereon and the valve flap is too large in the idle state. Due to the above-mentioned inherent short strokes of a piezo-actuated membrane, this may lead to the stroke not being large enough to correctly actuate the valve flap.

One could try to minimize the above-mentioned manufacturing tolerances in the manufacturing process. However, since these are microstructured components, a great deal of effort has to be invested to optimize corresponding manufacturing tolerances in the range of micrometers or nanometers. However, the minimization of the manufacturing tolerances and the quality control would involve disproportionally high costs, which in turn would contradict the desire for a simple and cost-efficient design.

In the production of such microstructured pumps, valves, or fluid flow controllers in general, there is conflict of objectives between a simple and cost-effective design and a highly precise production that allows actuation using the largest possible stroke and secure closure in the idle state in order to be able to ensure a normally-closed functionality.

SUMMARY

According to an embodiment, a microstructured fluid flow control device may have a substrate with a piezo-actuated first membrane arranged on a first substrate side, and a fluid channel that extends through the substrate between the first substrate side and an opposite second substrate side, a microvalve that extends through the fluid channel and is configured to close the fluid channel in an unactuated state, and a second membrane arranged on the first substrate side and spaced apart from the first membrane and arranged between the fluid channel and the first piezo-actuated membrane, wherein the second membrane is joined to the microvalve and is mechanically biased towards the first membrane so that a biasing force is applied to the microvalve, wherein the biasing force is part of a restoring force that causes the microvalve to close the fluid channel in an unactuated state.

A first fundamental embodiment of the invention concerns a microstructured fluid flow control device with at least two membranes. The microstructured fluid flow control device comprises a substrate with a piezo-actuated first membrane arranged on a first substrate side. In addition, the microstructured fluid flow control device comprises a fluid channel that extends through the substrate between the first substrate side and an opposite second substrate side. Advantageously, the fluid channel extends through the substrate vertically and as straight as possible. The fluid channel is to enable a fluid exchange between the fluid flow control device and a surrounding area. In addition, the microstructured fluid flow control device comprises a microvalve that extends through the fluid channel at least in portions. The microvalve is configured to close the fluid channel in an unactuated state, i.e. the microvalve is configured as a normally-closing valve. In principle, the microvalve is movable between an open and a closed position and is advantageously continuously adjustable. The microvalve may adopt at least two extreme positions, that is an open position and a closed position, i.e. the fluid flow control device controls between the two states "fully open" and "fully closed". The microvalve may adopt any number of positions between these two extreme positions, i.e. the fluid flow control device may control in any way the fluid flow that flows through the fluid channel. According to this first embodiment of the invention, the microstructured fluid flow control device comprises a second membrane. Similar to the piezo-actuated first membrane, the second membrane is arranged on the first substrate side and is spaced apart from the first membrane. The second membrane is arranged on the first substrate side between the fluid channel and the first piezo-actuated membrane. To this end, e.g., the first piezo-actuated membrane may be arranged on a first main surface of the substrate located on the first substrate side, wherein this first main surface defines a first horizontal substrate plane. A recess, in which the second membrane may be arranged, may be structured below the first membrane in the first main surface of the substrate. The recess may define a second horizontal substrate plane, i.e. the first membrane may be arranged in a first substrate plane, and the second membrane may be arranged in a second substrate plane located underneath so that the second membrane is arranged between the fluid channel and the first membrane. According to the invention, the second membrane is joined to the microvalve, i.e. the second membrane is firmly connected to the microvalve. Advantageously, the second membrane may be connected inseparably or permanently to the microvalve. For example, the microvalve and the second membrane may be bonded, glued, or welded to each other. For example, the microvalve may be joined to the second membrane in a material-fitted and/or form-fitted and/or force-fitted manner.

In addition, according to the invention, the second membrane is mechanically biased towards the first membrane. This mechanical bias applies a biasing force to the microvalve. In turn, this biasing force is part of a restoring force that causes the microvalve to close the fluid channel from the second substrate side in an unactuated state. As initially mentioned, the fluid channel fully extends through the substrate between the first and the second substrate sides. That is, the fluid channel comprises a first fluid channel opening located on the first substrate side and a second fluid channel opening located on the second substrate side. On the first substrate side, the microvalve extends beyond the first fluid channel opening and is there joined to the biased second membrane. On the opposite second substrate side, the microvalve may close the fluid channel opening to be as fluid-tight as possible. Thus, the second membrane arranged on the first side is used to bias the microvalve, wherein the part of the microvalve located on the opposite second substrate side closes the second fluid channel opening in an unactuated state due to said bias. A normally-closed microvalve can therefore be realized. In order to release, or open, the fluid channel, the microvalve may be actuated contrary to the restoring force by means of the piezo-actuated first membrane, wherein the biasing force forms a part of this restoring force. In contrast to the above-mentioned conventional technology, the advantage of this inventive fluid flow control device is the fact that manufacturing tolerances are acceptable to a significantly higher extent when biasing the membrane, since a part of the bias of the second membrane may be sufficient to close the fluid channel in a tight manner by means of the microvalve. That is, the second membrane does not have to fully return to its biased initial position in order to pull back the microvalve far enough so that the fluid channel is closed in a tight manner. Thus, manufacturing tolerances may be accepted to a significantly higher extent, leading to significant cost savings in the development and production of the fluid flow control device. In addition, the inventive fluid flow control device still comprises a simple and uncomplicated design, which also leads to minimizing the production resources.

According to an example, the microvalve may be arranged with respect to a fluid flow direction such that a fluid that flows in this fluid flow direction applies a fluid pressure force to the microvalve, wherein the fluid pressure force acts on the microvalve in addition to the biasing force, wherein the biasing force and the fluid pressure force are part of the restoring force that causes the microvalve to close the fluid channel in an unactuated state. Thus, for example, the fluid channel may be configured as an inlet channel, wherein the fluid enters into the fluid channel from the second substrate side. Accordingly, the microvalve would be arranged at least in portions in this inlet, and it could close the inlet on the second substrate side in an unactuated state due to the biasing force caused by the second membrane. In this case, the fluid pressure also acts on the microvalve from the second substrate side. So to speak, the fluid pressure acts on the microvalve from below and pushes it against the substrate. In this case, the fluid pressure force may advantageously act in the same direction as the biasing force so that the restoring force is increased by the size of the fluid pressure force. That is, the restoring force results from the fluid pressure force and the biasing force. Thus, on the inlet side, the microvalve is not only normally-closing (due to the bias) but also self-blocking (due to the fluid pressure).

A further advantage of the inventive fluid flow control device is that it may also be normally-closing (due to the bias) and self-blocking (due to the fluid pressure) in the opposite direction, i.e. on the outlet side. According to such an example, the microvalve may be arranged with respect to a fluid flow direction such that a fluid that flows in this fluid flow direction applies a fluid pressure force to the second membrane, wherein this fluid pressure force acts on the microvalve joined to the second membrane in addition to the biasing force, wherein the biasing force and the fluid pressure force are part of the restoring force that causes the microvalve to close the fluid channel in an unactuated state. Thus, for example, the fluid channel may be configured as an outlet channel, wherein the fluid exits the fluid channel on the second substrate side. Accordingly, the microvalve would be arranged at least in portions in this outlet, and it could close the outlet on the second substrate side in an unactuated state due to the biasing force caused by the second membrane. A first part of the fluid pressure acts on the microvalve from above, so to speak, i.e. contrary to the biasing force, and would normally cause the microvalve to open. However, in this case, a larger second part of the fluid pressure force acts on the second membrane, advantageously in the same direction as the biasing force, so that the overall restoring force is increased by the size of the second part of the fluid pressure force. That is, this second part of the fluid pressure force and the biasing force are a mutual part of the restoring force. This will be made clearer in the subsequent description with reference to the figures.

Thus, the microvalve is a valve that is actively actuated by means of the piezo-actuated first membrane. This has to be distinguished from conventional check valves or throttle check valves that are passively controlled via the fluid pressure that is present. Such check valves are usually also biased, e.g. by means of a coil spring. However, these valves only open up if the fluid pressure force applied acts contrary to the biasing force and is larger than the biasing force. These valves can only function in one direction and therefore have to be installed in a direction-dependent manner. However, the inventive fluid flow control device comprises an actively actuated microvalve. Thus, it may be installed regardless of the fluid flow direction. In addition, due to the active drive, it may be controlled more precisely than a conventional check valve.

According to an example of the first embodiment, the piezo-actuated first membrane may be configured to come in contact with the second membrane and to deflect the same in an actuated state in order to move the microvalve joined thereto contrary to the restoring force. In this example, the first membrane directly acts on the second membrane and deflects the same. This leads to the microvalve being actuated indirectly via the second membrane by means of the piezo-actuated first membrane.

According to a further example of the first embodiment, the microvalve may comprise a valve disc and a valve shaft arranged thereon, wherein the valve disc is arranged on the second substrate side facing away from the first membrane, and wherein the valve shaft extends through the fluid channel towards the first membrane arranged on the first substrate side. Provided on the second fluid channel opening located on the second substrate side may be a valve seat into which the valve disc may be fitted. Thus, the valve disc may close the fluid channel on the second substrate side in as fluid-tight a manner as possible. A microvalve configured in such a way comprises a simple and uncomplicated design.

According to a further example of the first embodiment, a portion of the valve shaft may extend through the second membrane so that this portion is arranged between the first membrane and the second membrane, and wherein the piezo-actuated first membrane is configured to, in an unactuated state, come in contact with this portion and to move the valve shaft through this contrary to the restoring force. In this example, the membrane acts directly on the microvalve, i.e. on the portion of the valve shaft that extends through the second membrane. This leads to the fact that the microvalve is directly actuated by means of the piezo-actuated first membrane. Optionally, the first membrane may additionally act directly on the second membrane in order to deflect the same and, in addition, to actuate the microvalve indirectly through this.

According to a further example of the first embodiment, the piezo-actuated first membrane may be spaced apart from the portion of the valve shaft that extends through the second membrane in an unactuated state. Thus, e.g., a clearance, or a slit, may be provided between the first membrane and the microvalve in order to realize an idle travel when the piezo-actuated first membrane is initially deflected so that manufacturing tolerances may be better compensated. The slit has the advantage that the microvalve may be securely pulled into the closed position by the second membrane despite deviations in the process of the piezo assembly. Setting the zero position of the piezo-actuated membrane may therefore be reliably ensured.

According to a further example of the first embodiment, the portion of the valve shaft that extends through the second membrane may be joined to the first membrane. In this case, manufacturing tolerances should be adhered to more precisely; however, the vertical stroke of the piezo-actuated first membrane may be used to the fullest possible extent without an initial idle travel.

According to a further example of the first embodiment, the piezo-actuated first membrane may be mechanically biased in a direction away from the second membrane so that the piezo-actuated first membrane is spaced apart from the second membrane in an unactuated state. In this case, manufacturing tolerances in the production of the (biased) first membrane and in the production of the biased second membrane may be tolerated to a proportionally large extent.

According to a further example of the first embodiment, the piezo-actuated first membrane may comprise one or several ventilation holes. This may be advantageous in changing environmental conditions such as with respect to a changing ambient pressure that may be compensated by the ventilation holes.

According to a further example of the first embodiment, the microstructured fluid flow control device may exclusively comprise non-magnetic materials. This is particularly advantageous if the inventive fluid flow control device is used as a medical device that a patient may permanently carry, e.g. through implantation. The non-magnetic fluid flow control device has the advantage that there are no interfering influences with respect to MRT (magneto-resonance tomography) examinations.

According to a further example, the piezo-actuated first membrane may comprise a vertical stroke of 20 µm to 50 µm. This significantly distinguishes the inventive microstructured fluid flow control devices from macro-structured valves and pumps.

According to a further example, the piezo-actuated first membrane may comprise a membrane thickness between 25 µm and 150 µm. Alternatively or additionally, the second membrane may comprise a membrane thickness between 25 µm and 150 µm. Such membrane thicknesses are well suited for the use in the inventive fluid flow control device and enable as flat an overall design of the fluid control device as possible.

As an alternative solution of the same above-described problem, a microstructured fluid flow control device with a single bias membrane is proposed in a second embodiment. According to this embodiment, the fluid control device comprises a substrate with a piezo-actuated membrane arranged on a first substrate side and a fluid channel that extends through the substrate between the first substrate side and an opposite second substrate side. The fluid flow control device further comprises a microvalve with a valve disc and a valve shaft arranged thereon, wherein the valve disc is arranged on the second substrate side facing away from the membrane, and wherein the valve shaft extends through the fluid channel towards the membrane arranged on the first substrate side. According to the invention, the piezo-actuated membrane is joined to the valve shaft and is mechanically biased in a direction facing away from the substrate so that a biasing force is applied to the microvalve. This biasing force is part of a restoring force that causes the valve disc to close the fluid channel in an unactuated state. According to this second embodiment, the fluid flow control device comprises only a single mechanically biased membrane that is joined to the microvalve, which simultaneously fulfils two functions. On the one hand, this membrane is used as the actuator membrane that is deflectable by means of a piezo element and that actuates the microvalve. On the other hand, the membrane, due to its bias, leads to the fact that a restoring force is applied to the microvalve in order to close the fluid channel in an unactuated state. When actuating the actuator membrane by means of the piezo element, it bends opposite to its biasing direction and deflects the microvalve contrary to the restoring force so that the microvalve opens the fluid channel in an actuated state. Providing only one membrane that simultaneously fulfils the two above-mentioned functions leads to a simple and uncomplicated design.

In principle, however, everything described herein with reference to the first embodiment also applies to the second embodiment. In particular, features of examples of the first embodiment may also be combined with examples of the second embodiment, and vice versa.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
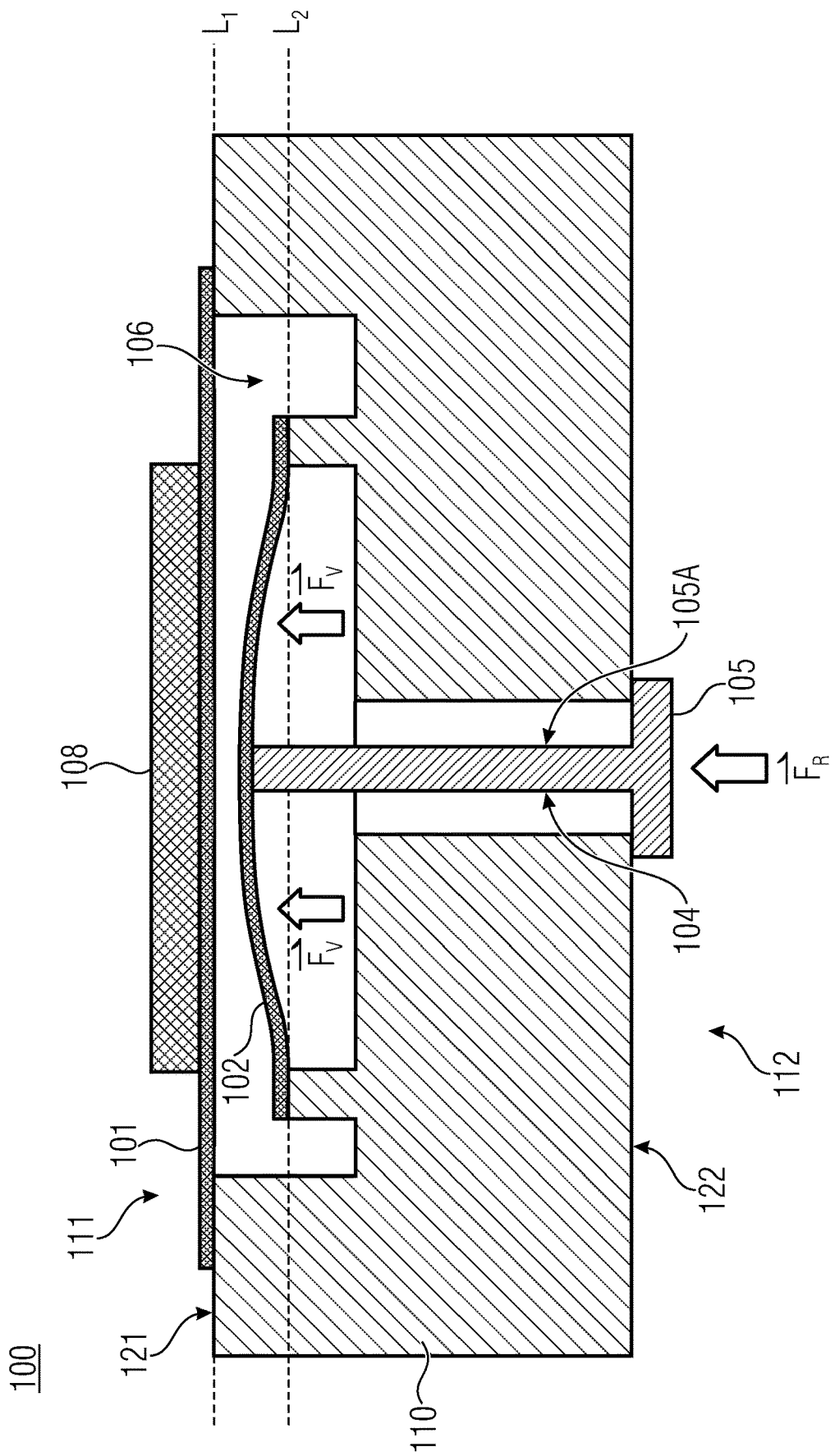
FIG. 1 shows a schematic sectional side view of an inventive fluid flow control device according to a first embodiment.

In the following, examples are described in more detail with respect to the drawings, wherein elements having the same or similar functions are provided with the same reference numerals.

FIG. 1 shows an inventive microstructured fluid flow control device 100 according to a first example.

The fluid flow control device 100 comprises a substrate 110. The substrate 110 may be a semiconductor substrate and may comprise silicon, for example, or the substrate 110 may be a metal substrate and may comprise metal, such as stainless steel or titanium, or may be manufactured thereof. The substrate 110 comprises a first substrate side 111 and an opposite second substrate side 112. The substrate 110 comprises a first main surface 121 located on the first substrate side 111 and a second main surface 122 located on the opposite second substrate side 112. A piezo-actuated first membrane 101 is arranged on the first substrate side 111. For example, as is exemplarily illustrated, the piezo-actuated first membrane 101 may be arranged on the first main surface 121 of the substrate 110, e.g. by means of bonding. Thus, the first main surface 121 of the substrate 110 may define a horizontal first substrate plane L1, wherein the piezo-actuated first membrane 101 would be arranged in this first substrate plane L1 in this case.

The piezo-actuated first membrane 101 may comprise a piezo element 108. The piezo element 108 may be arranged on the side of the first membrane 101 facing away from the substrate 110. By applying an (e.g. negative) electric voltage to the piezo element 108, it expands laterally, which leads to the first membrane 101 curving upwards, i.e. in the direction away from the substrate 110. By applying an electric voltage opposite in value (e.g. positive) to the piezo element 108, the piezo element 108 contracts laterally, which leads to the first membrane 101 deflecting downwards, i.e. in the direction towards the substrate 110.

The fluid flow control device 100 further comprises a fluid channel 104. The fluid channel 104 extends through the substrate 110 between the first substrate side 111 and the opposite second substrate side 112. The fluid channel 104 may extend between the first substrate side 111 and the second substrate side 112 vertically and as straight as possible as well as continuously.

In addition, the fluid flow control device 100 comprises a microvalve 105. The microvalve 105 comprises a valve portion 105A that is fully located within the fluid channel 104 and fully extends through the fluid channel 104.

The microvalve 105 is configured as a normally-closed valve. That is, the microvalve 105 is configured to close the fluid channel 104 in an unactuated state.

To this end, the inventive fluid flow control device 100 comprises a second membrane 102.

The piezo-actuated first membrane 101 and/or the biased second membrane 102 may comprise metal or a semiconductor, e.g. silicon, or may be manufactured thereof. The second membrane 102 is also arranged on the first substrate side 111. For example, a recess 106 may be structured in the first main surface 121 of the substrate 110. The second membrane 102 may be arranged in this recess 106. The recess 106 may define a horizontal second substrate plane L2, wherein the second membrane 102 is arranged in this second substrate plane L2. Stated in more general terms, the substrate 110 may comprise on the first substrate side 111 one or several horizontal substrate planes L1, L2 that may be spaced apart from each other in the vertical direction, and wherein the first membrane 101 is arranged in the first substrate plane L1 and the second membrane 102 is arranged in the second substrate plane L2.

The first substrate plane L1 may be further spaced apart from the second substrate side 112 than the second substrate plane L2. In principle, the first substrate plane L1 and the second substrate plane L2 may be vertically spaced apart from each other. Thus, the first membrane 101 may also be arranged vertically spaced apart from the second membrane 102. The fluid channel 104 is arranged below the second membrane 102, i.e. the second membrane 102 is arranged between the first fluid channel 104 and the first piezo-actuated membrane 101.

According to this first embodiment, the second membrane 102 is joined to the microvalve 105, according to the invention. That is, the microvalve 105 and the second membrane 102 are firmly connected to each other, advantageously permanently and inseparably. For example, the microvalve 105 may be bonded, glued, or welded to the second membrane 102.

In addition, according to the invention, the second membrane 102 is mechanically biased, that is upwards, i.e. towards the first membrane 101. Due to this mechanical bias, a biasing force $F_V$ is applied to the microvalve 105, wherein this biasing force $F_V$ is part of a restoring force $F_R$ that causes the microvalve 105 to close the fluid channel 104 in an unactuated state. That is:

$F_R = F_V + X$, wherein X=0 or may be an optional further force component.

The piezo-actuated first membrane 101 is herein also referred to as actuator membrane. The bias second membrane 102 joined to the microvalve 105 is herein also referred to as valve membrane. According to examples, the first membrane 101 may also be mechanically biased.

Fundamentally, mechanically biasing the membrane 101, 102 may be carried out according to a method as described in U.S. Pat. No. 9,410,641 B2 and whose content is explicitly incorporated herein by reference.

Figure 2A:
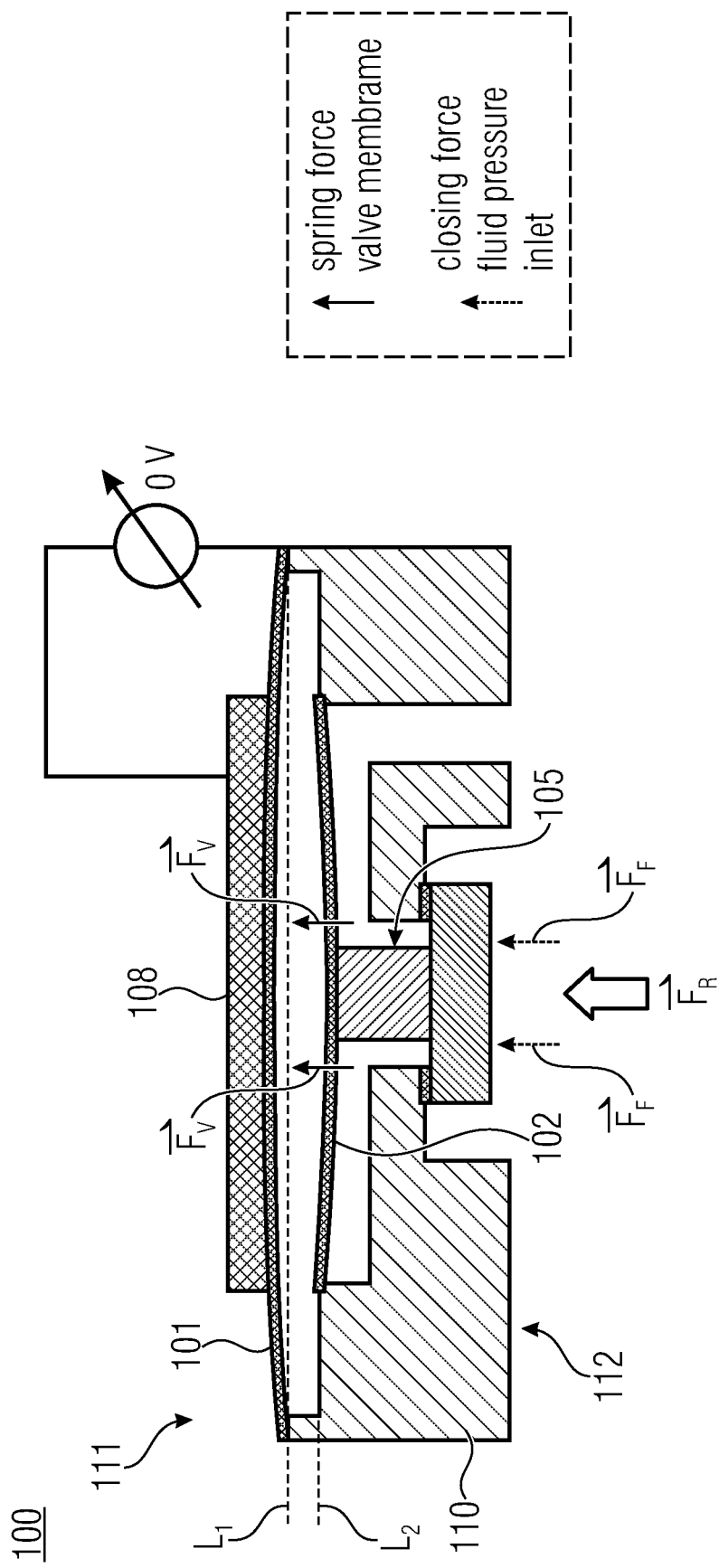
FIG. 2A shows a schematic sectional side view of an inventive fluid flow control device according to a first embodiment in an unactuated state.
Figure 2B:
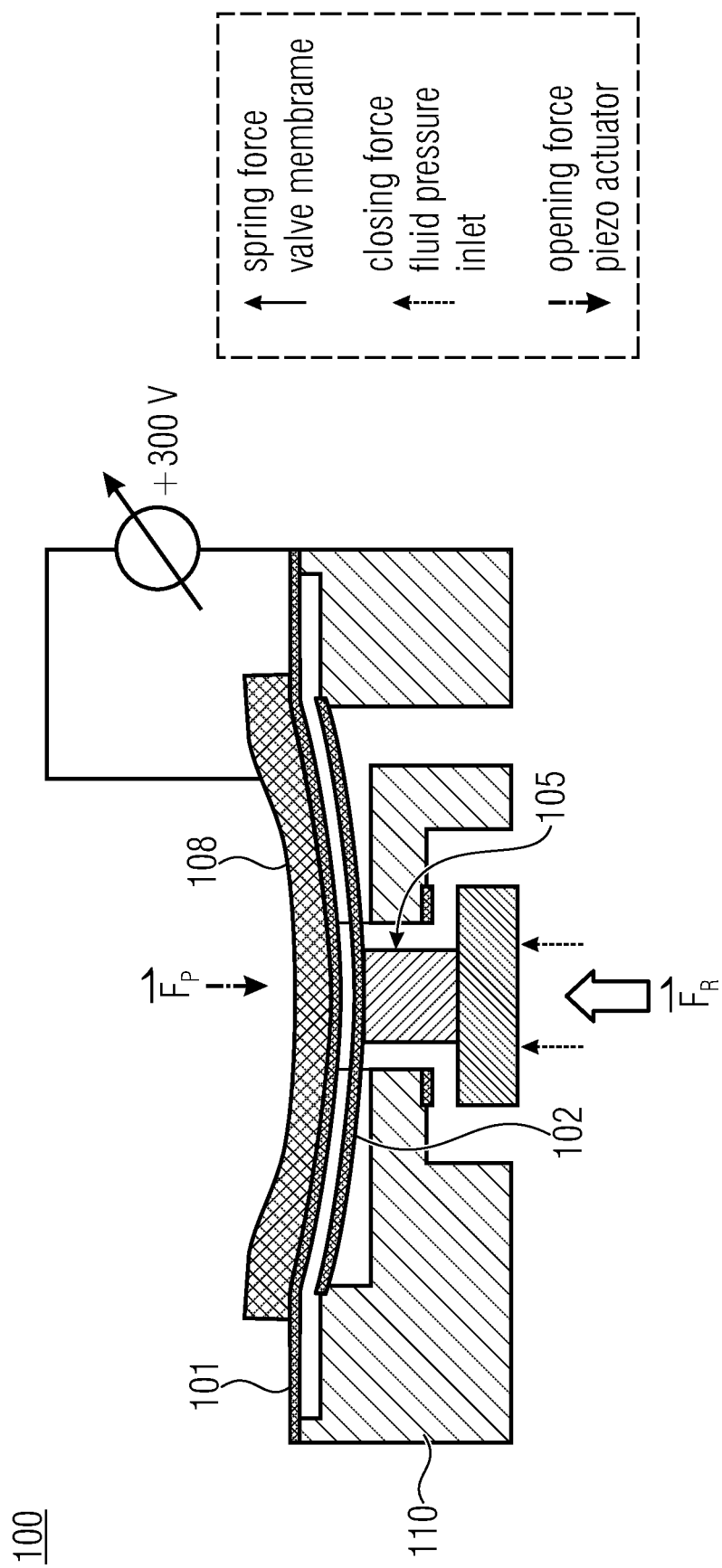
FIG. 2B shows a schematic sectional side view of an inventive fluid flow control device according to a first embodiment in an actuated state.

FIGS. 2A and 2B show a further example of an inventive fluid flow control device 100 with two membranes 101, 102 according to the first embodiment. FIG. 2A shows the fluid flow control device 100 in an unactuated state, and FIG. 2B shows the fluid flow control device 100 in an actuated state.

The fluid flow control device 100 illustrated here comprises a piezo-actuated first membrane 101 arranged on the first substrate side 111 and in a first horizontal substrate plane L1. In addition, the fluid flow control device 100 comprises a mechanically biased second membrane 102 arranged on the first substrate side 111 and in a second horizontal substrate plane L2.

As can be seen in FIG. 2A, the first membrane 101 may also be mechanically biased in addition to the second membrane 102. Due to the bias, the first membrane 100 may extend at least in portions beyond the first substrate plane L1. This increases a distance between the first membrane 101 and the second membrane 102.

The second membrane 102 is also mechanically biased, that is towards the first membrane 101, i.e., in principle, the second membrane 102 may be biased in the same direction as the first membrane 101. The bias of the second membrane 102 directly acts on the microvalve 105 joined to the second membrane 102 and pulls the microvalve 105 upwards, i.e. towards the first membrane 101. Thus, the microvalve 105 closes the fluid channel 104 in the unactuated state shown in FIG. 2A.

FIG. 2B illustrates an actuated state of the fluid flow control device 100. Here, an electric voltage of +300 V is exemplarily applied to the piezo element 108. As a consequence, the piezo element 108 contracts and deflects the first membrane 101 downwards, i.e. towards the second membrane 102.

The first membrane 101 contacts the second membrane 102 and consequently deflects the second membrane 102. Here, the actuation force $F_B$ applied to the first membrane 101 by the piezo element 108 is larger than the restoring force $F_R$ that acts on the microvalve 105. This is why the microvalve 105 is actuated contrary to the restoring force $F_R$, which subsequently releases, or opens, the fluid channel 104.

If the electric voltage is no longer applied, the first membrane 101 returns to its unactuated initial position shown in FIG. 2A. The size of the restoring force $F_R$ again exceeds the size of the actuation force $F_P$ so that the microvalve 105 also returns to its unactuated initial position shown in FIG. 2A and again closes the fluid channel 104. This function is also referred to as normally-closing.

Figure 3A:
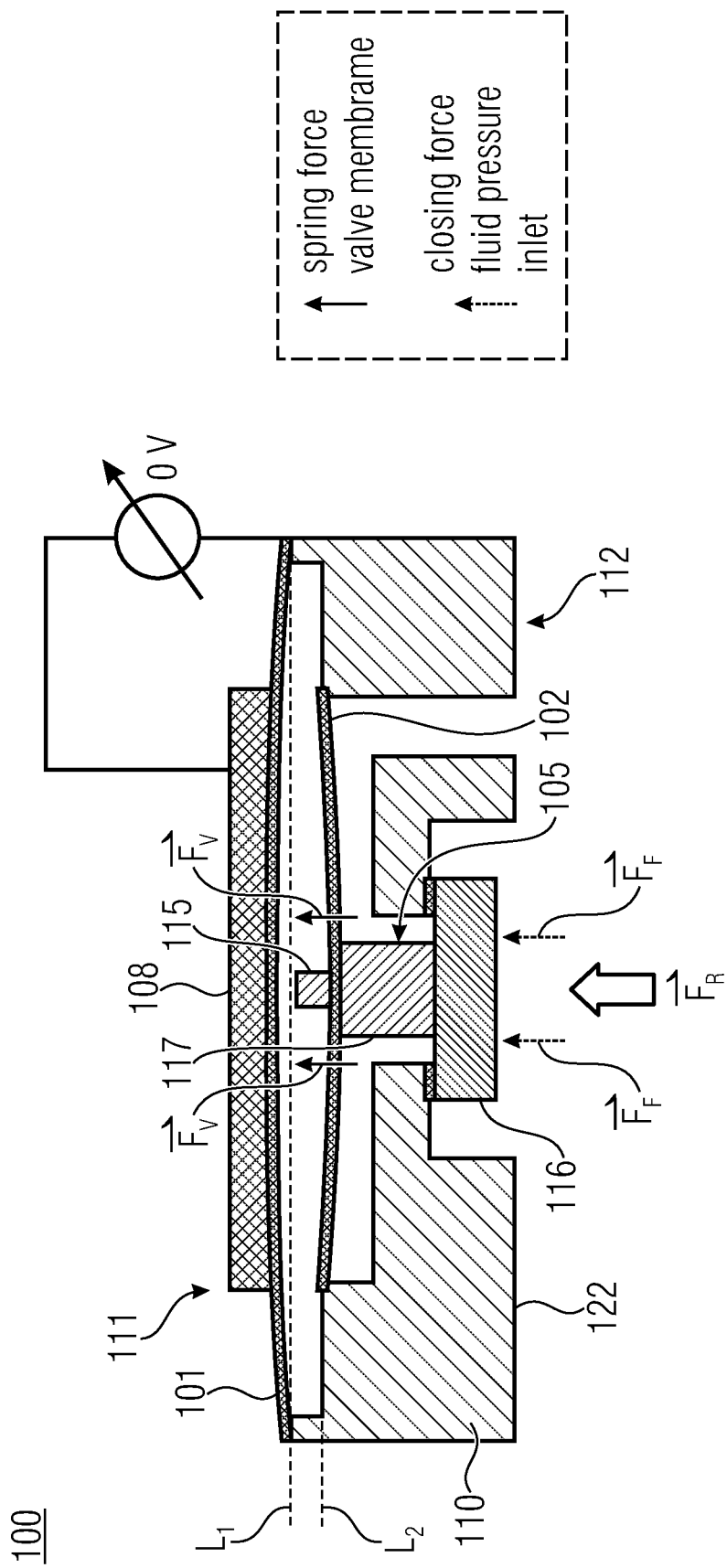
FIG. 3A shows a schematic sectional side view of an inventive fluid flow control device according to a first embodiment in an unactuated state.
Figure 3B:
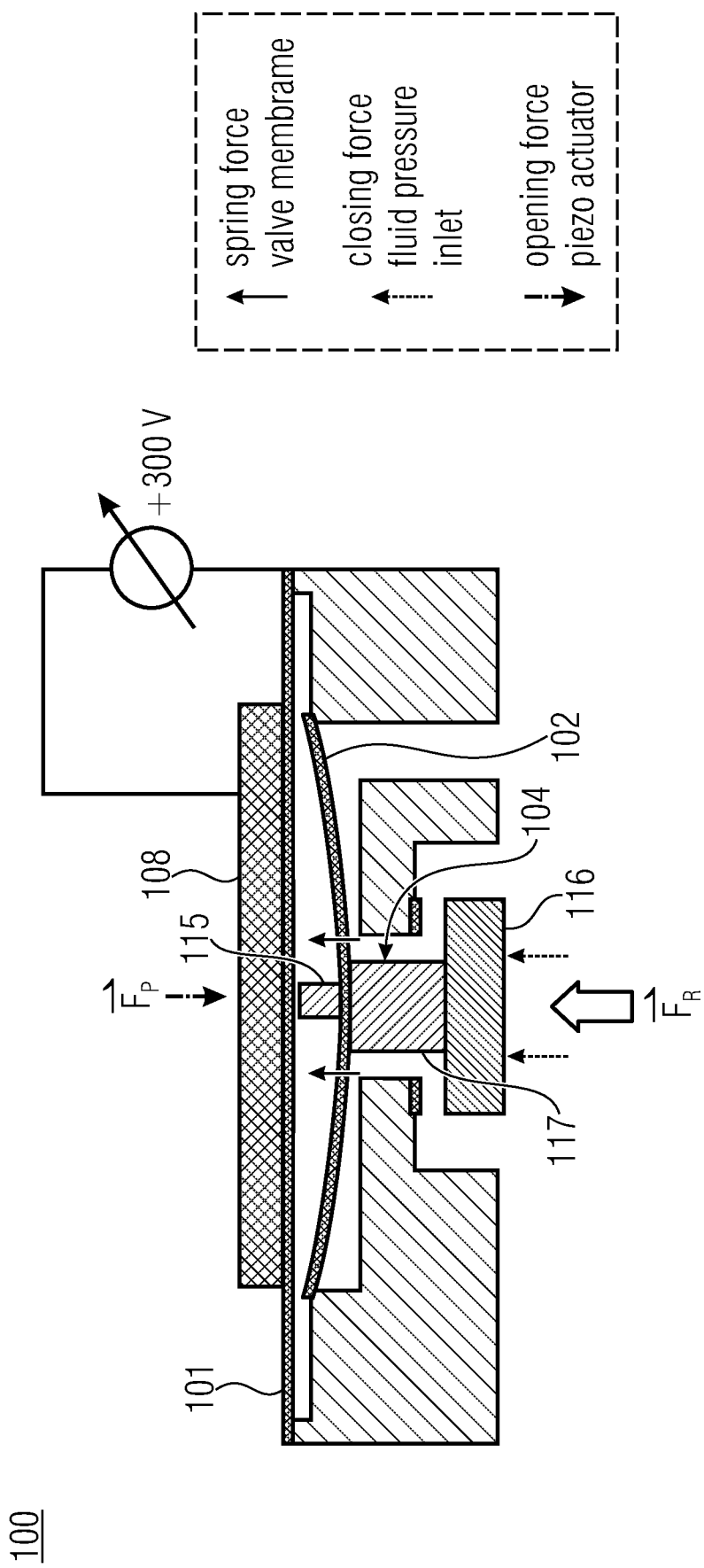
FIG. 3B shows a schematic sectional side view of an inventive fluid flow control device according to a first embodiment in an actuated state.

FIGS. 3A and 3B show a further example of an inventive fluid flow control device 100 with two membranes 101 and 102 according to the first embodiment. FIG. 3A shows the fluid flow control device 100 in an unactuated state, and FIG. 3B shows the fluid flow control device 100 in an actuated state.

In the variation shown here, the microvalve 105 comprises a valve disc 116 and a valve shaft 117 arranged thereon. The valve disc 116 is arranged on the second substrate side 112 that faces away from the first membrane 101, and closes the fluid channel 104 in the unactuated state. More precisely, the valve disc 116 closes a fluid channel opening arranged on the second substrate side 112.

The valve shaft 117 extends through the fluid channel 104, starting from the valve disc 116, towards the first substrate side 111 up to the second membrane 102.

In addition to the example shown in FIGS. 2A and 2B, the valve shaft 117 shown in FIGS. 3A and 3B comprises a portion 115 that extends through the second membrane 102 and projects beyond the second membrane 102 towards the first membrane 101. That is, this portion 115 of the valve shaft 117 that extends through the second membrane 102 is arranged between the first membrane 101 and the second membrane 102.

As can now be seen in FIG. 3B, when applying a voltage, the piezo element 108 deflects the first membrane 101 downwards, i.e. towards the fluid channel 104. In this case, the deflected first membrane 101 contacts the portion 115 of the valve shaft 117 that projects through the second membrane 102. The actuation force $F_P$ applied in this case acts directly on the valve shaft 117 via the portion 115 and therefore acts directly on the overall microvalve 105. If the size of the actuation force $F_P$ is larger than the size of the restoring force $F_R$, the microvalve 105, or the valve disc 116, lifts itself off of the fluid channel 104 and opens the same.

If the electric voltage is no longer applied, the first membrane 101 again returns to the unactuated initial position shown in FIG. 3A. In this case, the size of the restoring force $F_R$ again exceeds the size of the actuator force $F_P$ so that the microvalve 105 also returns to its unactuated initial position shown in FIG. 3A, and the valve disc 116 again closes the fluid channel 104.

FIGS. 4A and 4B again show an inventive fluid flow control device 100 in an unactuated state in order to describe the acting forces in more detail.

Figure 4A:
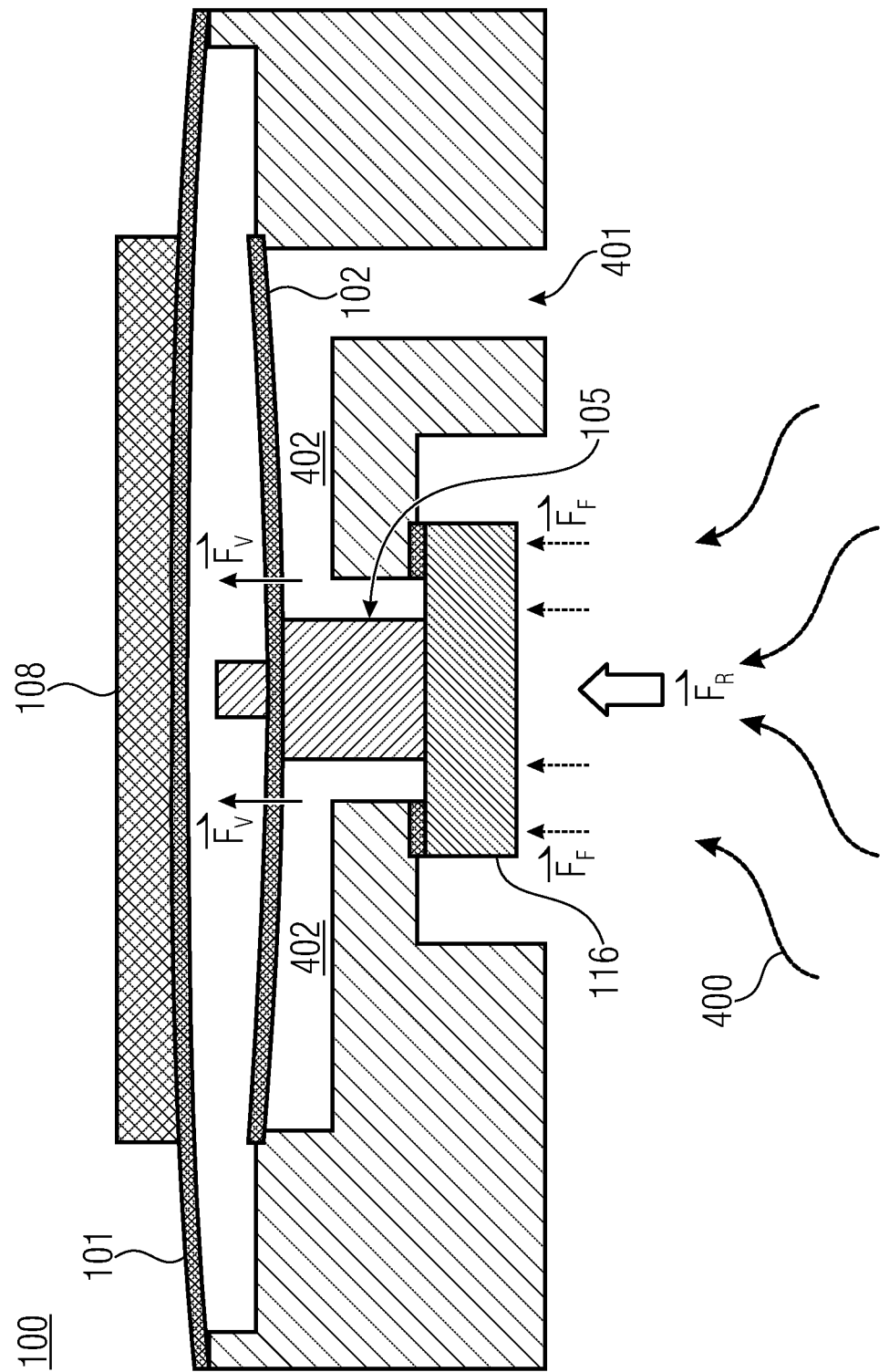
FIG. 4A shows a schematic sectional side view of an inventive fluid flow control device according to a first embodiment in an unactuated state, wherein the microvalve is configured as an inlet valve.

In FIG. 4A, the fluid 400 flows from a surrounding area towards the fluid channel 104. Thus, in this example, the fluid channel 104 would be an inlet channel and the microvalve 105 would be configured as an inlet valve. If the microvalve 105 is open, the fluid 400 may enter into a space 402 between the two membranes 102 and the substrate 110, which is also referred to as fluid chamber, and may exit from an outlet channel 401.

In the illustrated case, a fluid force $F_F$ directly acts on the microvalve 105 in addition to the biasing force $F_V$ caused by the bias of the second membrane 102. In the present example, the fluid force $F_F$ directly acts on the valve disc 116 from below, i.e. from the surrounding area, for example. In this case, the fluid force $F_F$ essentially acts in the same direction as the biasing force $F_V$. Thus, the normally-closing effect is increased, wherein the microvalve 105 closes the fluid channel 104 in an unactuated state. In this case, the restoring force $F_R$ is essentially made up of the biasing force $F_V$ and the additionally acting force $F_F$, i.e.:

$$F_R = F_V + F_F$$

Stated in more general terms, the microvalve 105 may be arranged with respect to the fluid flow direction such that a fluid 400 that flows in this fluid flow direction applies a fluid pressure force $F_F$ to the microvalve 105, wherein the fluid pressure force $F_F$ acts on the microvalve 105 in addition to the biasing force $F_V$ and in the same direction as the biasing force $F_V$, wherein the biasing force $F_V$ and the fluid pressure force $F_F$ are part of the restoring force $F_R$ that causes the microvalve 105 to close the fluid channel 104 in an unactuated state.

Thus, in the inlet direction, the fluid flow control device 100 is not only normally-closing but also self-blocking.

Figure 4B:
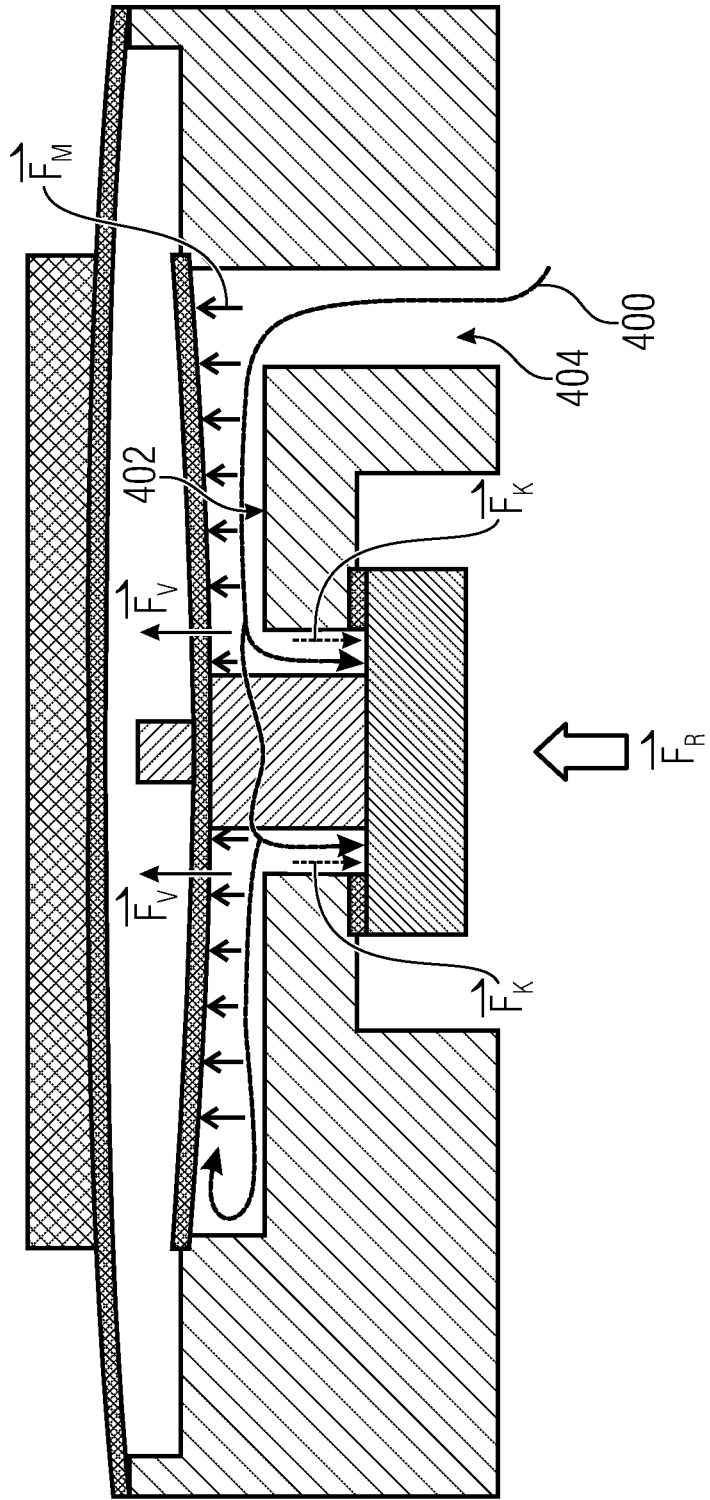
FIG. 4B shows a schematic sectional side view of an inventive fluid flow control device according to a first embodiment in an unactuated state, wherein the microvalve is configured as an outlet valve.

In FIG. 4B, the fluid 400 flows from the surrounding area through an inlet 404 into the space 402, which is also referred to as fluid chamber, between the membrane 102 and the substrate 110. Thus, in this example, the fluid channel 104 would be an outlet channel and the microvalve 105 would be configured as an outlet valve.

In this case, a k-th part $F_K$ of the fluid force $F_F$ acts from above on the microvalve 105, more particularly on the valve disc 106, i.e. from the first substrate side 111, contrary to the restoring force $F_R$. An m-th part $F_M$ of the fluid force $F_F$ acts from below on the second membrane 102 in the same direction as the restoring force $F_R$, i.e. towards the first membrane 101.

In an example, the second membrane 102 comprises a first attack surface $A_M$ for the fluid 400, and the valve disc 116 comprises a second attack surface $A_V$ for the fluid 400. In this case, the second membrane 102 provides a larger attack surface for the fluid 400, i.e. $A_M > A_V$. The fluid pressure $P_{RA}$ that acts on the respective surface $A_M$ or $A_V$ generates a proportional fluid force, i.e. $F_M = P_{Fluid} \cdot A_M$ and $F_K = P_{Fluid} \cdot A_K$. Since $A_M > A_V$ at the same fluid pressure $P_{Fluid}$, $F_M > F_V$ also applies. That is, the force $F_M$ that acts on the second membrane 102 towards the restoring force $F_R$ is larger than the force $F_V$ that acts on the microvalve 105 contrary to the restoring force $F_R$.

Stated in more general terms, the microvalve 105 may be arranged with respect to a fluid flow direction such that a fluid 400 flowing in this fluid flow direction applies a fluid pressure force $F_M$ to the second membrane 102, wherein this fluid pressure force $F_M$ acts on the microvalve 105 joined to the second membrane 102 in addition to the biasing force $F_V$ and in the same direction as the biasing force $F_V$, wherein the biasing force $F_V$ and the fluid pressure force $F_M$ are part of the restoring force $F_R$ that causes the microvalve 105 to close the fluid channel 104 in an unactuated state.

Thus, the present inventive fluid flow control device 100 is normally-closing and self-blocking both the inlet direction and in the outlet direction.

In the examples discussed before with respect to FIGS. 2A to 3B, the piezo-actuated first membrane 101 was spaced apart from the portion 115 of the valve shaft 117 that extends through the second membrane 102 in an unactuated state. For example, the piezo-actuated first membrane 101 may be mechanically biased in a direction away from the second membrane 102 so that the piezo-actuated first membrane 101 is spaced apart from the second membrane 102 in an unactuated state. This distance allows for greater manufacturing tolerances when biasing the first membrane 101 and/or when biasing the second membrane 102, however, it leads to a certain idle travel when actuating the free flow control device 100, or the microvalve 105.

Alternatively, it would also be conceivable that the portion 115 of the valve shaft 117 that extends through the second membrane 102 is joined to the first membrane 101. That is, the portion 115 could be firmly connected to the first membrane 101, advantageously permanently and inseparably. In this case, the idle travel would not exist, even with a biased first membrane 101, and the microvalve 105 could be deflected by means of the piezo-actuated first membrane 101 in an idle travel-free manner, so to speak.

Figure 5:
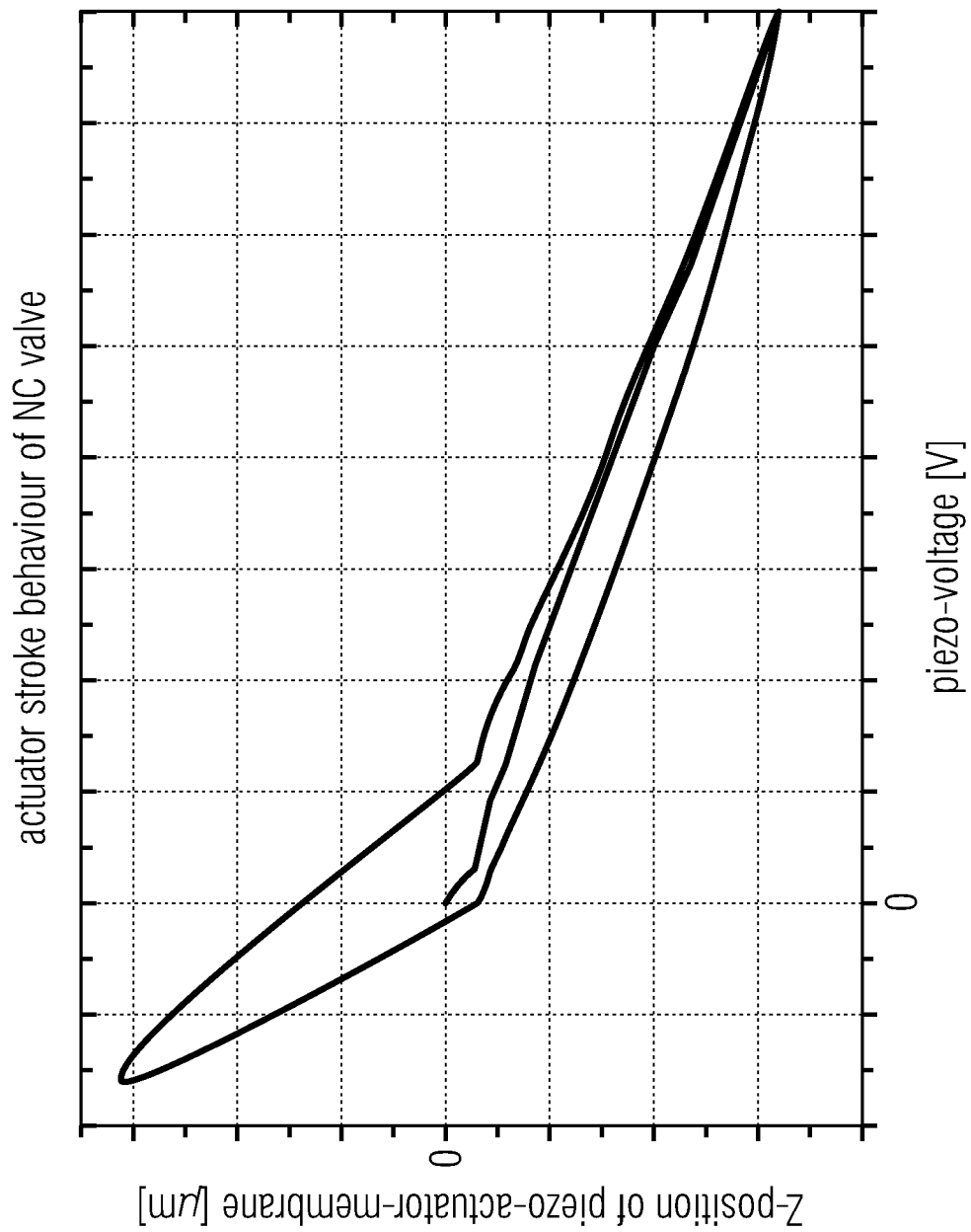
FIG. 5 shows a characteristic actuator curve of an inventive fluid flow control device.

FIG. 5 shows a diagram for illustrating the behavior of the piezo-actuated first membrane 101, i.e. the vertical deflection of the first membrane 101 as a reaction to applying an electric voltage to the piezo element 108. The electric voltage is plotted on the abscissa, and the vertical deflection (in the z-direction) is plotted on the ordinate. The diagram shows a typical characteristic actuator curve (vertical deflection with respect to electric voltage at the piezo ceramic) of a normally-closed microvalve 105 that may be used in the inventive fluid flow control device 100.

When applying a positive voltage, the first membrane 101 is deflected downwards, that is towards the second membrane 102 (cf. FIGS. 2A to 4B). When applying a negative voltage, the first membrane 101 is deflected upwards, i.e. away from the substrate 110. In this case, the force/deflection capacity is symmetrical. Due to the piezophysics, in contrast to the positive voltage, a relatively low negative voltage can be applied before the piezo repolarizes.

However, in the diagram illustrated in FIG. 5, the above-mentioned idle travel can be seen. With negative voltages, the first membrane 101 is deflected upwards and away from the microvalve 105 and shows a characteristic curve that is not affected by the force. With positive voltages, the first membrane 101 contacts the second membrane 102 (FIGS. 2A and 2B), or the valve shaft portion 115 (FIGS. 3A and 3B), and opens the microvalve 105 downwards contrary to the restoring biasing force $F_V$ of the second membrane 102, i.e. towards the second substrate side 112, which leads to a flatter characteristic curve. In addition, what can be seen is the idle travel (approximately 3 µm to 5 µm) up to the contact of the second membrane 102, or the valve shaft portion 115, before the characteristic curve breaks off.

As initially mentioned, the microvalve 105 may be moved between two extreme positions, i.e. between a fully open and a fully closed position. Due to the active drive by means of the piezo-actuated first membrane 101, the microvalve 105 may further be moved continuously between these two extreme positions, which is why the throughput, or the throughput amount, of a fluid flowing through the microvalve 105 may also be continuously controlled. That is, the inventive fluid flow control device 100 may continuously control a fluid flow.

That is, beside opening or closing the fluid channel 104, a functional feature of the inventive fluid flow control device 100 may also be the representation of a controllable flow resistor in the sense of a proportional valve. By moving the microvalve 105 to any position between the open and closed state, a corresponding operating point in the pressure/throughput diagram (cf. FIG. 6) may be selected.

Figure 6:
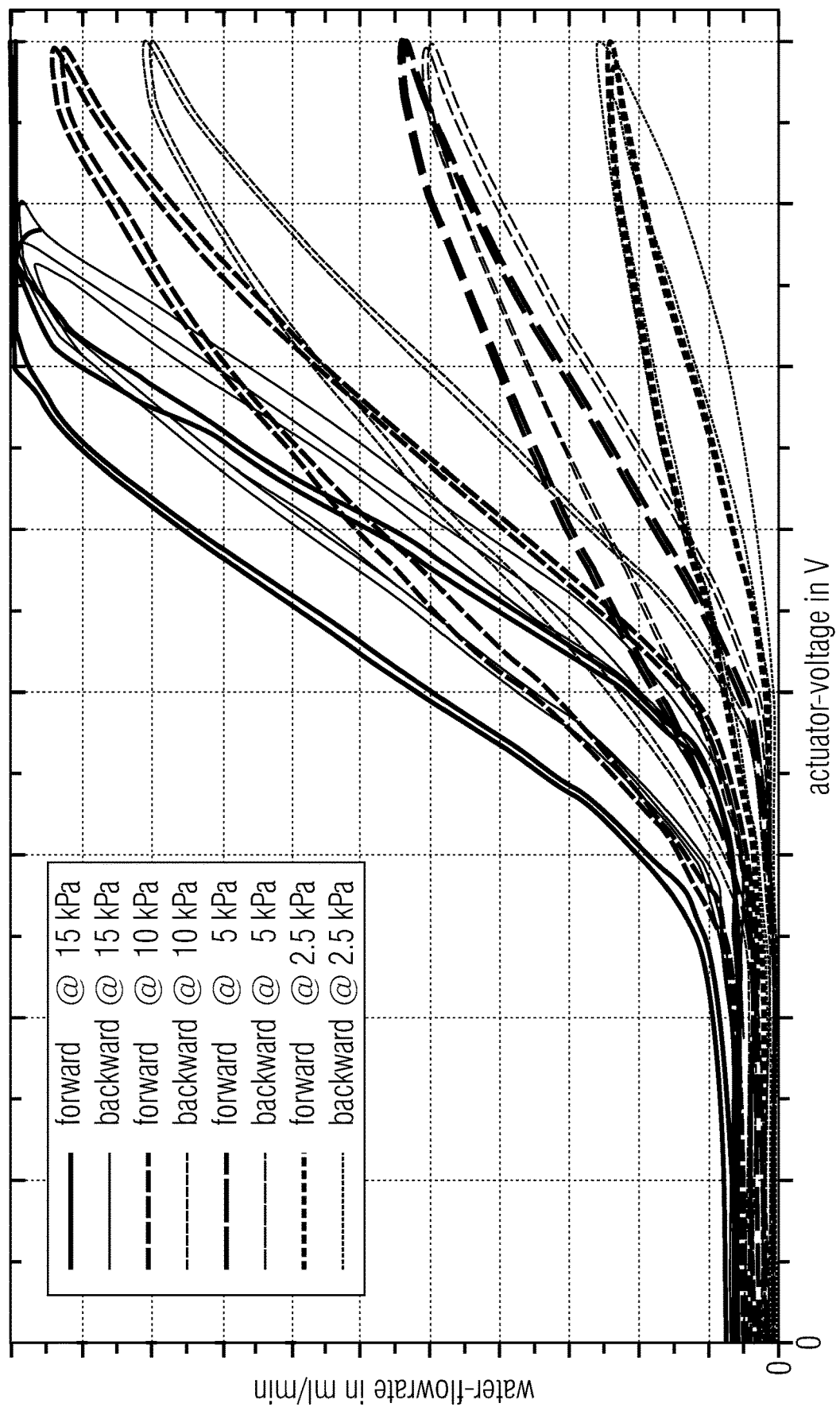
FIG. 6 shows a pressure/throughput diagram of an inventive fluid flow control device.

FIG. 6 shows a typical pressure/throughput diagram of a microvalve 105 when used in an inventive through flow control device 100, the fluid being water. The throughput is plotted for different differential pressures across the microvalve 105 as a function of the electric voltage applied to the piezo element 108.

Figure 7A:
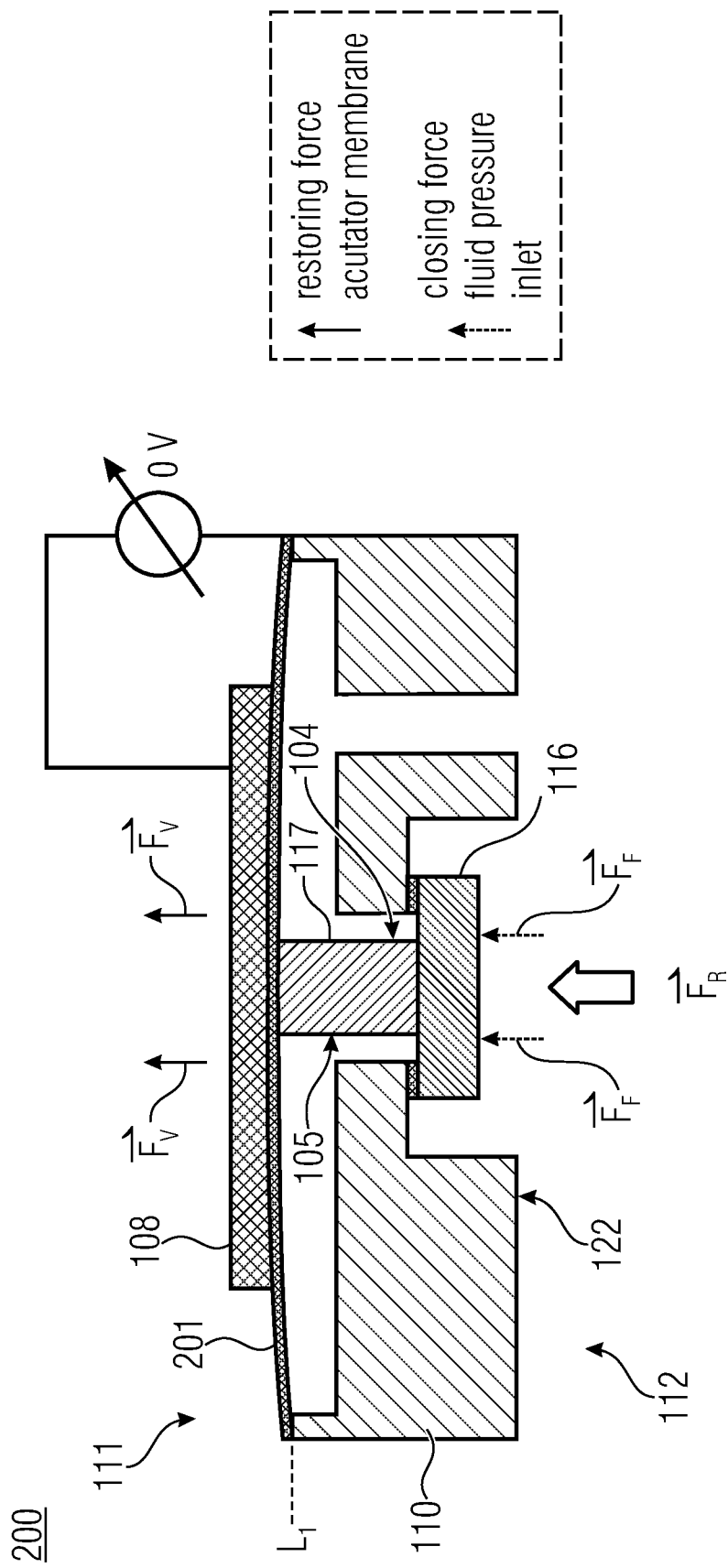
FIG. 7A shows a schematic sectional side view of an inventive fluid flow control device according to a second embodiment in an unactuated state.
Figure 7B:
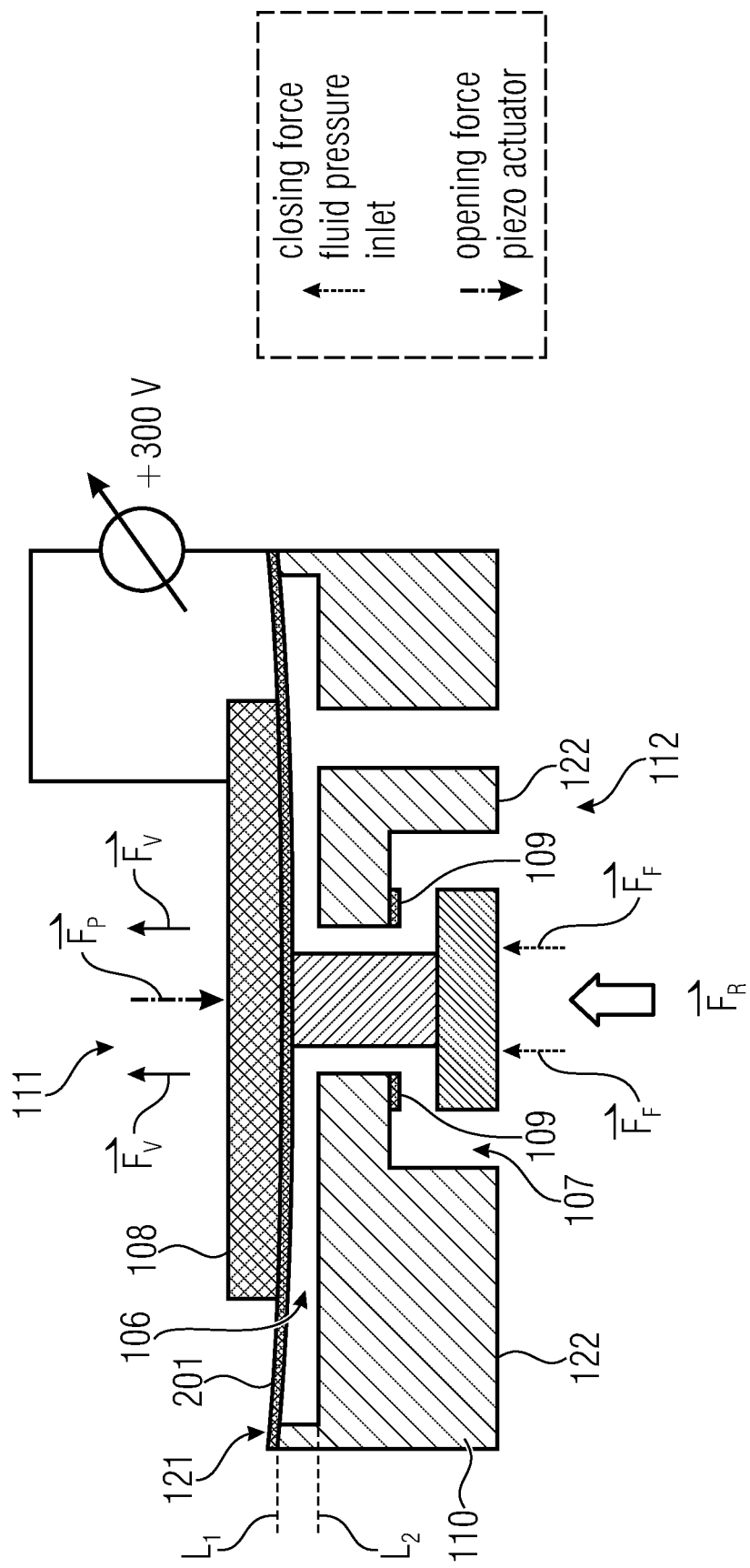
FIG. 7B shows a schematic sectional side view of an inventive fluid flow control device according to a second embodiment in an actuated state.

FIG. 7A and 7B show a second embodiment of an inventive fluid flow control device 200, this embodiment only comprising a single membrane 201. FIG. 3A shows the fluid flow control device 200 in an unactuated state, and FIG. 3B shows the fluid flow control device 200 in an actuated state.

Elements having the same or a similar function as in the above-described first embodiment (FIGS. 1 to 4B) are represented with the same reference numerals, which is why a description of the same is omitted. Nevertheless, all elements, features, and functions described with respect to the first embodiment also apply to the subsequently discussed second embodiment. Thus, what is subsequently describes are only the differences between the second embodiment shown in FIG. 7A and 7B and the first embodiment shown in FIGS. 1 to 4B.

The embodiment shown in FIG. 7A and 7B differs in that the inventive microstructured fluid flow control device 200 only comprises one membrane 201 that is mechanically biased and joined to the microvalve 105, and also comprises a piezo element 108. That is, the membrane 201 simultaneously acts as the actuator membrane and as the valve membrane. The membrane 201 may comprise metal or a semiconductor, such as silicon, or be manufactured therefrom.

The illustrated microstructured fluid flow control device 200 comprises a substrate 110 with a piezo-actuator 201 arranged on a first substrate side 111, and a fluid channel 104 that extends through the substrate 110 between the first substrate side 111 and an opposite substrate side 112.

The microstructured fluid flow control device 200 further comprises a microvalve 105 with a valve disc 116 and a valve shaft 117 arranged thereon, wherein the valve disc 116 is arranged on the second substrate side 112 facing away from the membrane 201, and wherein the valve shaft 117 extends through the fluid channel 104 towards the membrane 201 arranged on the first substrate side 111. That is, the valve shaft 117 is arranged at least in portions on the first substrate side 111, and the valve disc 116 is arranged on the opposite second substrate side 112. In the unactuated state, the valve shaft 116 may close a fluid channel opening located on the second substrate side 112.

According to the invention, the piezo-actuated membrane 201 is joined, or fixedly connected, to the microvalve 105, in particular to the valve shaft 117. Advantageously, the membrane 201 is connected permanently and inseparably to the microvalve 105, or the valve shaft 117.

In addition, the piezo-actuated membrane 201 is mechanically biased, that is towards a direction facing away from the substrate 110, so that the membrane 201 curves away from the substrate 110 in an unactuated state (FIG. 7A) and optionally extends beyond the substrate plane L1. Due to the mechanical bias, a biasing force $F_V$ is here again applied to the microvalve 105, wherein the biasing force $F_V$ is part of a restoring force $F_R$ that causes the valve disc 116 to close the fluid channel 104 in an unactuated state.

FIG. 7B shows the microstructured fluid flow control device 200 of FIG. 7a in an actuated state. When applying an electric voltage, here exemplarily having a magnitude of +300 volts, the piezo element 108 deflects the membrane 201 downwards, i.e. towards the substrate 110, or the fluid channel 104. The actuation force $F_P$ of the piezo element 108 acts contrary to the restoring force $F_R$, which may be made up of the biasing force $F_V$ of the membrane and a fluid force $F_F$ that may be present at the microvalve 105.

If the actuation force $F_P$ of the piezo element 108 exceeds the resorting force $F_R$ in magnitude, the membrane 201 deflects the microvalve 105 downwards, i.e. towards a direction away from the fluid channel 104, so that the microvalve 105 lifts off from the fluid channel 104 and opens, or releases, the fluid channel 104.

That is, in an unactuated state, the piezo-actuated membrane 201 may be configured to be deflected towards the fluid channel 104 and to move the microvalve 105 opposite the restoring force $F_R$ in a direction away from the fluid channel 104 so that the microvalve 105 releases the fluid channel 104.

In the second embodiment illustrated in FIGS. 7A and 7B, the membrane 201 may also be arranged in a first horizontal substrate plane L1 that may coincide with the first main surface 121 of the substrate 110. That is, the membrane 201 may be arranged on the first main surface 121 of the substrate 110 on the first substrate side 111.

A recess 106 that extends towards the second substrate side 112 and defines a second horizontal substrate plane L2 may be structured in the first main surface 121 of the substrate 110. In this case, the recess 106 between the membrane 201 on the first substrate plane L1 and the structured portion of the substrate 110 of the second substrate plane L2 may also be referred to as fluid chamber into which the fluid flows if the microvalve 105 is configured as an inlet valve, or from which the fluid flows out if the microvalve 105 is configured as an outlet valve (cf. FIGS. 4A and 4B).

Representing all embodiments described herein, FIG. 7B exemplarily shows that, a recess 107 which extends towards the first substrate side 111 and in which the microvalve 105, or the valve disc 116, may be arranged may also be provided on the second substrate side 112, or in a second main surface 122 of the substrate 110, for example. For example, this recess 107 may be structured into the second main surface 122 of the substrate 110. The depth of the recess 107 may approximately correspond to the vertical stroke of the microvalve 105 so that the microvalve 105, or the valve disc 116, is still located within the recess 107 even when fully deflected. This provides a mechanical stop protection for the microvalve 105.

Also representing all described embodiments, FIG. 7B exemplarily shows that a sealing valve seat 109 may be provided at an opening of the fluid channel 104 that faces the valve disc 116. For example, this may be a non-adhesive valve seat with a lower release force, which may comprise one or several elastomers.

In all embodiments, the microvalve 105 may be linearly moveable between an open position and a closed position. The microvalve 105 may be brought into at least two extreme positions, i.e. a fully closed position in which the fluid channel 104 is as fluid-tight as possible, and a fully open position in which the fluid channel 104 is as open as possible. In this case, the inventive microstructured fluid flow control device 100, 200 may actively control the fluid flow at least between these two positions. Alternatively or in additionally, the microvalve 105 may be moved gradually in at least one further position or continuously between the two extreme positions (open/closed). In this case, the inventive microstructured fluid flow control device 100, 200 may gradually or continuously control the fluid flow in the sense of a proportional valve.

In addition, it is conceivable in all embodiments that the piezo-actuated membrane 101, 201 comprises one or several ventilation holes. Due to additional ventilation holes in the piezo-actuated membrane 101, 201, a pressure compensation may be achieved from the air-filled chamber (recess 106) between the piezo-actuated membrane 101 and the second membrane 102 (first embodiment), or between the piezo-actuated membrane 201 and the substrate 110 (second embodiment), with respect to the atmosphere above the piezo-actuated membrane 101 201, leading to a stabilization of the zero position of the drive for fluctuating environmental conditions.

In addition, it is conceivable in all embodiments that the microstructured fluid flow control device 100, 200 exclusively comprises non-magnetic materials. This provides an MRT capability due to non-magnetic materials (e.g. titanium) and actuator principles.

In addition, it is conceivable in all embodiments that the micro-actuated membrane 101, 201 comprises a vertical stroke of 20 μm to 50 μm. In addition, it is conceivable that the piezo-actuated membrane 101, 201 comprises a membrane thickness between 25 μm and 150 μm, and/or that the second membrane 102 comprises a membrane thickness between 25 μm and 150 μm.

For example, the inventive fluid flow control device 100 200 may be used in the following technical areas:
Medical Technology:
Implants
Sphincter, penile prosthesis
Extracorporeal medical devices:
Drug dosing, intravenous, subcutaneous
Industry:
Oil Dosing
Microhydraulics/micropneumatics
Shut-off valve (failsafe)

The invention shall again be summarized below in other words:

An aspect of the present invention is a piezo-electrically driven, normally-closing and self-blocking microvalve 105 in a small and particularly flat design. That is, in the currentless state, the valve 105 is closed and the fluid pressure $F_F$ that is present additionally enhances the closing force.

The principle is based on a deflection of the vertical direction of action of a piezo membrane converter 101 through a transmission element 117 on a non-inversely opposite seal seat 109, creating the possibility to use the restoring force $F_R$ of a non-electrically actuated (i.e. unactuated) piezo membrane converter 101 towards its zero position in the balance of forces. This passive restoring force $F_R$ that is achieved through a spring membrane 102 and a corresponding biasing method is used in the new invention to close the valve 105 in the currentless state.

A seal element (e.g. a valve disc) 116 that is fixedly connected to a transmission element (e.g. a valve shaft) 117 is pulled in the closing direction against a seal seat 109 through a biased valve membrane 102 according to a restoring spring. The valve membrane 102 is joined to the seal element 116 and the valve base body 105 in a fluidically tight manner. A further membrane, i.e. the actuator membrane 101, is joined to the base body 110 in the plane L2 above the valve membrane 102. A piezo-disc actuator 108 may be applied to this actuator membrane 101, e.g. by means of adhesion, using an electric biasing assembly according to U.S. Pat. No. 9,410,641 B2 so that a finite residual slit remains between the actuator membrane 101 and the transmission element 117 in the currentless state of the piezo-actuator 108.

Thus, in the currentless state (cf. FIG. 3A, for example), the seal seat 109 of the valve 115 is closed by the seal element 116, corresponding to a normally-closed state. In addition, a fluid pressure $F_F$ acts on the seal element 116 from the inlet side of the valve 115 as a further closing force component.

In the powered state, i.e. when applying a positive electric voltage to the piezo ceramic 108 (cf. FIG. 3B, for example), that actuator membrane 101 is deformed towards the transmission element 117 and moves the same away from the seal seat 109 into an opening direction if the force $F_P$ of the piezo membrane converter 101 acting vertically on the transmission element 117 is larger than the restoring forces $F_R$ of the valve membrane 102 and the fluid pressure $F_F$ on the seal element 116. This may be achieved by an adapted actuator design with respect to the specification of the corresponding operating region.

A further embodiment of the valve 115 may be such that the transmission element 117 is still directly welded to the actuator membrane 101 and that the slit is therefore omitted.

A further embodiment (cf. FIGS. 7A and 7B, for example) of the valve 115 may be such that the valve membrane 102 is omitted and that the transmission element 117 is permanently kept in the closed position through a welding/bonding connection to the actuator membrane 101 due to the bias, as long as it is currentless.

As can be seen in FIGS. 7A and 7B, the transmission element 117 is directly joined to the actuator membrane 101 and, in the currentless state, is kept closed due to the bias. On the other hand, it is opened by applying a positive electric field at the piezo-actuator 108.

Design of the Valve Structure:
Foil construction on a solid base body 110
A piezo-actuator 108 as a membrane bending transducer
A deflection unit/valve seal element 116, 117 in different versions
An intermediate membrane 102 (also referred to as valve membrane) with the following purpose:
Biasing the transmission/seal element 116, 117 against the valve seat 109
Pressure compensation due to smaller effective area for fluid pressure Stroke optimization→the actuator 101 may be designed independently of the restoring membrane 102

Materials: metals, in particular spring steel and titanium, plastics

Manufacturing method:
  Base body 110: machining (turning, milling), additive manufacturing
  Foils: structured etching Joining method: adhesion, soldering (laser, resistance welding, ultra-sonic, e-beam)

Seal seat: hard-hard or possibly soft seal

Technical Properties:

No energy consumption in the closed state→normally-closed

Flat design: typically structural height of less than 5 mm

Footprint: circular base body diameter of approximately less than 25 mm, e.g. 20 mm or 15 mm Typical thicknesses of the valve membrane and actuator membrane 101, 102, 201 are 25 μm to 150 μm, for example Typical piezo-actuator thicknesses, e.g. 100 μm-200 μm Normally-closing on both sides (forward and backward, cf. characteristic flow curve)

Self-blocking: fluid pressure acts in both directions in a blocking manner on the seal element 116 and/or translated via the valve membrane 102 on the transmission element 117

Low leakage rate in the closed state

Low flow resistance in the open state

Short switching times due to piezo-actuators: from closed to open in t <5 ms

MRT capability due to non-magnetic materials (titanium) and actuator principles

Exemplary actuator design of the piezo membrane actuator system:
  Vertical stroke in the opening direction at a positive voltage (i.e. downwards): 20 μm to 50 μm
  Actuator force/blocking pressure 30 kPa to 100 kPa Pressure compensation: due to ventilation holes in the actuator membrane 101, the membrane remains stable in the original zero position in case of fluctuations of the ambient pressure No energy consumption in the closed state at a small installation size, and non-magnetic materials allow the use in active implants. There is no known technical solution for this so far.

(+++) no energy consumption in the closed state
(+++) normally-closing on both sides
(+++) self-blocking functionality
(+++) MRT capability due to non-magnetic materials (titanium) and actuator principles
(++) flat structural size (structural height <5 mm)
(++) short switching times (a few milliseconds)
(+) low leakage rate in the closed space
(+) low flow resistance in the open state (high flow rate)

While this invention has been described in terms of several embodiments, there are alterations, permutations, and equivalents that fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Microstructured fluid flow control device, comprising:
a substrate with a piezo-actuated first membrane arranged on a first substrate side, and a fluid channel that extends through the substrate between the first substrate side and an opposite second substrate side,
a microvalve that extends through the fluid channel and is configured to close the fluid channel in an unactuated state, and
a second membrane arranged on the first substrate side and spaced apart from the first membrane and arranged between the fluid channel and the first piezo-actuated membrane,
wherein the second membrane is joined to the microvalve and is mechanically biased towards the first membrane so that a biasing force is applied to the microvalve,
wherein the biasing force is part of a restoring force that causes the microvalve to close the fluid channel in an unactuated state.

2. Microstructured fluid flow control device according to claim 1,
wherein the microvalve is arranged with respect to a fluid flow direction such that a fluid flowing in this fluid flow direction applies a fluid pressure force to the microvalve, wherein the fluid pressure force acts on the microvalve in addition to the biasing force,
wherein the biasing force and the fluid pressure force are part of the restoring force that causes the microvalve to close the fluid channel in an unactuated state.

3. Microstructured fluid flow control device according to claim 1,
wherein the microvalve is arranged with respect to a fluid flow direction such that a fluid flowing in this fluid flow direction applies a fluid pressure force to the second membrane, wherein this fluid pressure force acts on the microvalve joined to the second membrane in addition to the biasing force,
wherein the biasing force and the fluid pressure force are part of the restoring force that causes the microvalve to close the fluid channel in an unactuated state.

4. Microstructured fluid flow control device according to claim 1,
wherein the piezo-actuated first membrane is configured, in an actuated state, to be deflected towards the second membrane and to move the microvalve contrary to the restoring force so that the microvalve releases the fluid channel.

5. Microstructured fluid flow control device according to claim 4,
wherein the piezo-actuated first membrane is configured, in an actuated state, to directly come in contact with the second membrane and to deflect the same in order to move the microvalve joined thereto contrary to the restoring force.

6. Microstructured fluid flow control device according to claim 1,
wherein the microvalve comprises a valve disc and a valve shaft arranged thereon, wherein the valve disc is arranged on the second substrate side, and wherein the valve shaft extends through the fluid channel towards the first substrate side.

7. Microstructured fluid flow control device according to claim 6,
wherein a portion of the valve shaft extends through the second membrane so that this portion is arranged between the first membrane and the second membrane, and wherein the piezo-actuated first membrane is configured, in an actuated state, to come in contact with this portion and to thereby move the valve shaft contrary to the restoring force.

8. Microstructured fluid flow control device according to claim 7,
wherein, in an unactuated state, the piezo-actuated first membrane is spaced apart from the portion of the valve shaft that extends through the second membrane.

9. Microstructured fluid flow control device according to claim 7,
wherein the portion of the valve shaft that extends through the second membrane is joined to the first membrane.

10. Microstructured fluid flow control device according to claim 1,
wherein the piezo-actuated membrane is mechanically biased in a direction away from the second membrane so that, in an unactuated state, the piezo-actuated first membrane is spaced apart from the second membrane.

11. Microstructured fluid flow control device according to claim 1,
wherein the piezo-actuated first membrane comprises one or several ventilation holes.

12. Microstructured fluid flow control device according to claim 1,
wherein the microstructured fluid flow control device exclusively comprises non-magnetic materials.

13. Microstructured fluid flow control device according to claim 1,
wherein the piezo-actuated first membrane comprises a stroke of 20 µm to 50 µm.

14. Microstructured fluid flow control device according to claim 1,
wherein the piezo-actuated first membrane comprises a membrane thickness between 25 µm and 150 µm, and/or wherein the second membrane comprises a membrane thickness between 25 µm and 150 µm.

* * * * *